United States Patent
Sun et al.

(10) Patent No.: US 10,943,352 B2
(45) Date of Patent: Mar. 9, 2021

(54) OBJECT SHAPE REGRESSION USING WASSERSTEIN DISTANCE

(71) Applicant: Palo Alto Research Center Incorporated, Palo Alto, CA (US)

(72) Inventors: Jin Sun, Redwood City, CA (US); Sricharan Kallur Palli Kumar, Mountain View, CA (US); Raja Bala, Pittsford, NY (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 113 days.

(21) Appl. No.: 16/222,062

(22) Filed: Dec. 17, 2018

(65) Prior Publication Data

US 2020/0193607 A1 Jun. 18, 2020

(51) Int. Cl.
*G06T 7/13* (2017.01)
*G06T 7/62* (2017.01)
*G06T 7/143* (2017.01)
*G06N 3/04* (2006.01)
*G06N 3/08* (2006.01)
*G06N 5/04* (2006.01)

(52) U.S. Cl.
CPC .............. *G06T 7/13* (2017.01); *G06N 3/0454* (2013.01); *G06N 3/088* (2013.01); *G06N 5/046* (2013.01); *G06T 7/143* (2017.01); *G06T 7/62* (2017.01)

(58) Field of Classification Search
None
See application file for complete search history.

(56) References Cited

U.S. PATENT DOCUMENTS

| 10,497,257 B2* | 12/2019 | Sohn | G08G 1/0129 |
| 10,614,207 B1* | 4/2020 | Truong | G06K 9/6264 |
| 10,614,557 B2* | 4/2020 | Lin | G06N 3/04 |
| 10,679,046 B1* | 6/2020 | Black | G06N 3/084 |
| 10,789,755 B2* | 9/2020 | Amer | G06N 3/088 |
| 2011/0129147 A1* | 6/2011 | Monga | H04N 1/603 382/167 |
| 2015/0035825 A1* | 2/2015 | Zhou | G06T 13/40 345/419 |
| 2017/0061253 A1* | 3/2017 | Burgos | G06T 7/70 |
| 2018/0077400 A1* | 3/2018 | Ayari | H04N 13/271 |
| 2018/0218502 A1* | 8/2018 | Golden | G06T 7/10 |
| 2019/0122329 A1* | 4/2019 | Wang | G06K 9/66 |
| 2019/0197662 A1* | 6/2019 | Sloan | G06T 7/50 |
| 2019/0223819 A1* | 7/2019 | Mansi | G06N 20/00 |
| 2019/0332846 A1* | 10/2019 | Wu | G06T 7/251 |

(Continued)

OTHER PUBLICATIONS

Arjovsky M, Chintala S, Bottou L. Wasserstein gan. arXiv preprint arXiv:1701.07875. Jan. 26, 2017 (Year: 2017).*

(Continued)

*Primary Examiner* — Michelle M Entezari
(74) *Attorney, Agent, or Firm* — Shun Yao; Park, Vaughan, Fleming & Dowler LLP

(57) ABSTRACT

One embodiment can provide a system for detecting outlines of objects in images. During operation, the system receives an image that includes at least one object, generates a random noise signal, and provides the received image and the random noise signal to a shape-regressor module, which applies a shape-regression model to predict a shape outline of an object within the received image.

20 Claims, 9 Drawing Sheets

(56) References Cited

U.S. PATENT DOCUMENTS

2019/0347567 A1* 11/2019 Njie .................. G06N 3/04

OTHER PUBLICATIONS

Cao, Yang-Jie, Li-Li Jia, Yong-Xia Chen, Nan Lin, Cong Yang, Bo Zhang, Zhi Liu, Xue-Xiang Li, and Hong-Hua Dai. "Recent advances of generative adversarial networks in computer vision." IEEE Access 7 (2018): 14985-15006. (Year: 2018).*

Wanchao Su et al. "Interactive Sketch-Based Normal Map generation with Deep Neural Networks" Proceedings of the ACM on Computer graphics and interactive Techniques, ACM, 2 Penn Plaza, Suite 701New York NY 10121-0701USA, vol. 1, No. 1, Jul. 25, 2018, pp. 1-17, XP058411866, DOI: 10.1145/3203186 sections 3.1-3.3, 4, 5.

Xin Yi et al. Unsupervised and semi-supervised learning with Categorical Generative Adversarial Networks assisted by Wasserstein distance for dermoscopy image classification, Arxiv. Org, Cornell University Library, 201 Olin Library Cornell University Ithica, NY 14853, Apr. 10, 2018, XP080869509, Sections I, III, V, VI.

Baumgartner Christian F. et al. "Visual Feature Attribution Using Wasserstein GANs", 2018 IEEE/CVF Conference on Computer vision and Pattern Recognition, IEEE, Jun. 18, 2018, pp. 8309, 8319, XP033473754, DOI: 10.1109/CVPR.2018.00867 [retrieved on Dec. 14, 2018] sections 3.2, 3.3, 4, 4.2, 5.

Zhang Qianqian et al. Medical Image synthesis with Generative Adversarial Networks for Tissue Recognition 2018 IEEE International Conference on Healthcare Infomatics (ICHI), IEEE, Jun. 4, 2018, pp. 199-207, XP033377141, doi; 10.1109/ICH1.2018.00030 [retrieved on Jul. 24, 2018] sections II, III.B, IV.

Zheng Ziqiang et al. Instance Map Based Image Synthesis With a Denoising Generative Adversarial Network, IEEE Access, vol. 6, Jun. 20, 2018, pp. 33654-33665, XP011686562, DOI: 10.1109/ACCESS.2018.2849108 [retrieved on Jul. 3, 2018] sections II and IV.

* cited by examiner

149 ITERATIONS

949 ITERATIONS

OBJECT SHAPE REGRESSION USING WASSERSTEIN DISTANCE

BACKGROUND

Field

This disclosure is generally related to computer vision systems. More specifically, this disclosure is related to a system and method using a neural network framework to predict object shape.

Related Art

Object detection (e.g., detection of faces, buildings, cars, etc., in images) is a fundamental problem in computer vision. The current approaches in object detection often involve generating coarse axis-aligned bounding boxes (AABB) of objects. For example, many face-detection applications create rectangular boxes around detected faces. Such boxes typically do not conform to the shape of the object and, thus, have limited utility in fine-grain scene analysis. On the other hand, object-contour detection (e.g., detecting the detailed outline of an object) can provide more accurate shape information associated with the object. In fact, the ability to accurately find object boundaries can have far-reaching implications for many vision tasks, including segmentation, recognition, and scene understanding Current approaches, such as Polygon-RNN, detect and track an object's boundary or contour by using a recurrent neural network (RNN) to predict points (as part of a polygon) along the outline or contour of the object. More specifically, given an image patch of a current predicted point on the outline of the object, Polygon-RNN can regress the next predicted point's 2D location. However, the Polygon-RNN approach has its shortcomings. Polygon-RNN often requires a number of hand-picked hyper-parameters corresponding to the number of points on the outline, and needs special treatment of the first point.

SUMMARY

One embodiment can provide a system for detecting outlines of objects in images. During operation, the system receives an image that includes at least one object, generates a random noise signal, and provides the received image and the random noise signal to a shape-regressor module, which applies a shape-regression model to predict a shape outline of an object within the received image.

In a variation on this embodiment, the system further trains the shape-regression model. During training, the system obtains a set of training images. A respective training image is annotated and comprises at least one object, and the annotated training image is associated with a set of true shape outlines. The system inputs the training images and a random noise signal to the shape-regression model to obtain estimated shape outlines, provides the estimated shape outlines and true shape outlines to a discriminator module that computes a Wasserstein distance between probability distributions of the estimated shape outlines and true shape outlines, and optimizes parameters of the shape-regression model based on the Wasserstein distance computed by the discriminator module.

In a further variation, optimizing the shape-regression model can include updating parameters of the shape-regression model in such a way that the computed Wasserstein distance is reduced.

In a further variation, the shape-regressor module is implemented as a first neural network, and the discriminator module is implemented as a second neural network.

In a further variation, the first and second neural networks together form a generative adversarial network (GAN).

In a variation on this embodiment, the shape outline is defined in terms of Cartesian x-y coordinates along a boundary of the object.

In a variation on this embodiment, the shape outline is defined in terms of probabilities of image pixels belonging to a boundary of the object.

One embodiment can provide an apparatus for detecting outlines of objects in images. The apparatus can include a receiving module configured to receive an image comprising at least one object, a noise generator configured to generate a random noise signal, and a shape-regressor module configured to receive the image and random noise signal and apply a shape-regression model to predict a shape outline of the object within the received image.

BRIEF DESCRIPTION OF THE FIGURES

In the figures, like reference numerals refer to the same figure elements.

DETAILED DESCRIPTION

Figure 1:
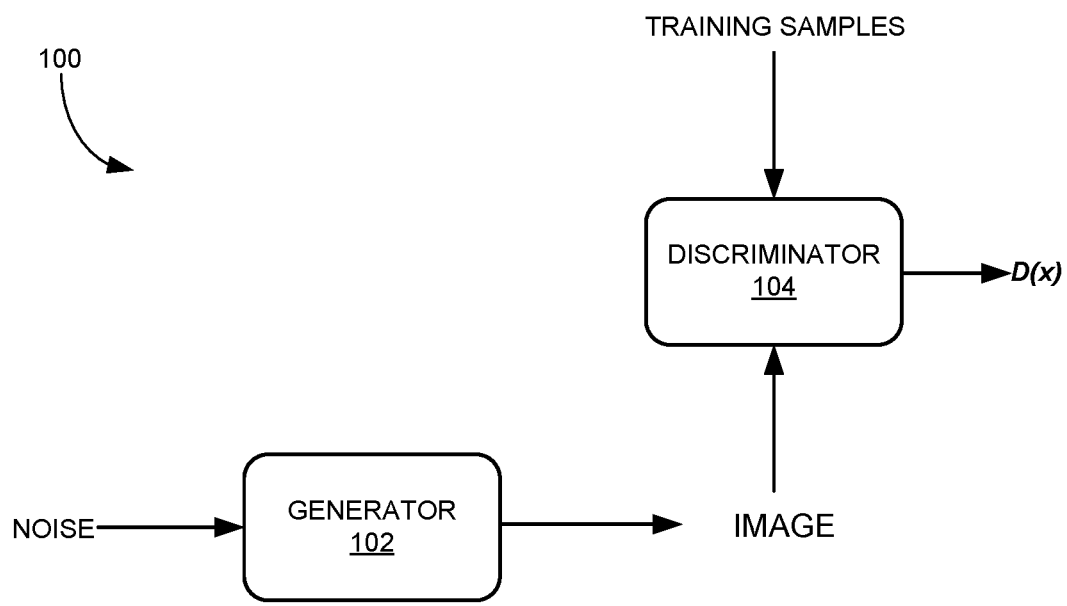
FIG. 1 shows an exemplary generative adversarial network (GAN) architecture (prior art).

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of automatically detecting boundaries of objects in images. More specifically, the system is based on a W-GAN (Wasserstein generative adversarial network) that is modified for detecting object boundaries. The W-GAN can be trained by minimizing the Wasserstein distance between the inferred boundary of an image and the ground truth (i.e., human annotation) of the boundary of the image. The W-GAN framework can include a shape regressor (i.e., the generator) and a W-score calculator (i.e., the discriminator). The shape regressor can take an image and a set of random noise as input and output predicted boundary points. The discriminator can compute the Wasserstein distance between the predicted boundary points and ground truth boundary points. The shape regressor can be trained by minimizing the Wasserstein distance.

Wasserstein GAN

Generative adversarial networks (GANs) are a class of artificial intelligence algorithms used in unsupervised machine learning, implemented by a system of two neural networks contesting with each other in a zero-sum game framework. In recent years, GANs have become popular for generating synthetic data, such as synthetic but realistic images. To do so, a GAN typically includes a generator neural network (which is referred to as a generator) and a discriminator neural network (which is referred to as a discriminator).

During operation, the generator learns to map from a latent space to a particular data distribution of interest, while the discriminator discriminates between instances from the true data distribution and candidates produced by the generator. The generator's training objective is to increase the error rate of the discriminator (i.e., "fool" the discriminator network) by producing novel synthesized instances that appear to have come from the true data distribution. Using image generation as an example, the generator may produce synthetic image samples as outputs, and try to improve the quality of the synthetic image samples by "convincing" the discriminator that these images are real images. The discriminator is tasked with distinguishing real image samples from the generated synthetic image samples. The discriminator determines whether an image, as a whole, is real or not. As a result, through multiple iterations, the generator learns to generate a synthetic image that incorporates the statistical properties of a real image.

FIG. 1 shows an exemplary generative adversarial network (GAN) architecture (prior art). A GAN 100 can include a generator 102 and a discriminator 104. Generator 102 can sample a noise using normal or uniform distribution and use a deep network to create an output (e.g., an image). The output of generator 102 can be sent to discriminator 104, which determines whether its input (i.e., the output of generator 102) is real or generated by comparing it with the training samples. Discriminator 104 can output a value (e.g., D(x)) to estimate the chance that its input is real.

The Wasserstein distance (also referred to as the earth mover's distance, or EMD) is a distance function defined between probability distributions. Wasserstein GANs (W-GANs) refer to GANs that use the Wasserstein distance as a metric (e.g., the loss function). More specifically, the discriminator uses the Wasserstein distance to judge the quality of images outputted by the generator, and encourages high quality synthesized images. The generator's training objective is to minimize the Wasserstein distance between the generated candidate images and the true images (sometimes referred to as the ground truth). The Wasserstein distance between distributions $P_r$ and $P_g$ can be defined as:

$$W(P_r, P_g) = \inf_{\gamma \in \prod(P_r, P_g)} E_{(x,y) \sim \gamma}[\|x - y\|],$$

where $\Pi(P_r, P_g)$ denotes the set of all joint distributions $\gamma(x, y)$ whose marginals are respectively $P_r$ and $P_g$. Intuitively, $\gamma(x, y)$ indicates how much "mass" must be transported from x to y in order to transform the distributions $P_r$ into the distribution $P_g$. It can be proved that simple sequences of probability distributions converge under the Wasserstein distance. Moreover, it can be proved that the Wasserstein distance is continuous and differentiable and, thus, can provide continuously smooth gradients during training. Such properties can be beneficial in training the discriminator. More specifically, in W-GAN, the discriminator can be trained till optimality.

W-GAN for Object Shape Detection

In computer vision, a regression-based method can be used for object detection by learning a regression function that directly maps image appearance to the presence and location of an object. As a specific example, a shape-regressor module can be used to generate outline points (i.e., points on the outline) of an object in an image. More particularly, the output of the shape-regressor module can be the 2D position (e.g., Cartesian x-y coordinates) of the outline points. For example, given the input of the shape regressor being an image, the output of the shape regressor can be a set of coordinates (e.g., $((x_1, y_1), (x_2, y_2), \ldots, (x_n, y_n))$ or the conditional probability of these coordinates given the appearance of the image.

Various techniques can be used to realize the shape-regressor module. In some embodiments, the shape-regressor module implements a feedforward neural network. In further embodiments, the neural network can be a multi-layer perceptron network.

Figure 2:
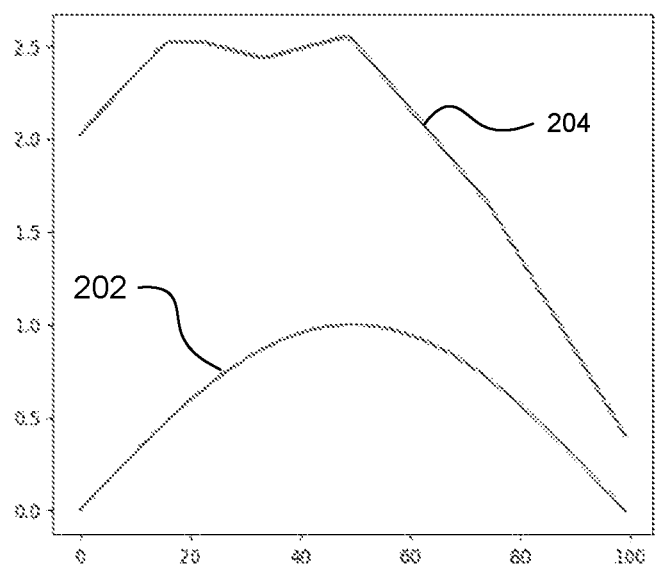
FIG. 2 shows an exemplary early iteration output of a GAN generator, according to one embodiment of the present invention.

In some embodiments, the shape-regressor module can be part of a GAN. More specifically, the shape-regressor module can be the generator of the GAN and can be responsible for generating candidates. In applications where synthetic images are needed, the generator of the GAN generates candidate images, whereas in embodiments of the present invention, the GAN generator (i.e., the shape-regressor module) generates outline points. In order to train the GAN, a number of annotated sample images can be used. More specifically, outlines of one or more objects within the sample images have been marked manually. During operation, an image of interest along with a certain amount of noise (which creates variations of the original sample images or perturbed images) can be sent to the generator, which can generate a candidate outline of the object. FIG. 2 shows an exemplary early iteration output of a GAN generator, according to one embodiment. In FIG. 2, curve 202 can be the target shape (i.e., the sample) and curve 204 can be the generator output. FIG. 2 clearly shows a significant difference between the beginning output of the generator and the target image. In some embodiments, representations of the image (e.g., a multi-dimensional vector) can be used as input to the GAN generator, and the noise can be generated by a random number generator. Moreover, the noise can have a normal or uniform distribution.

Figure 3:
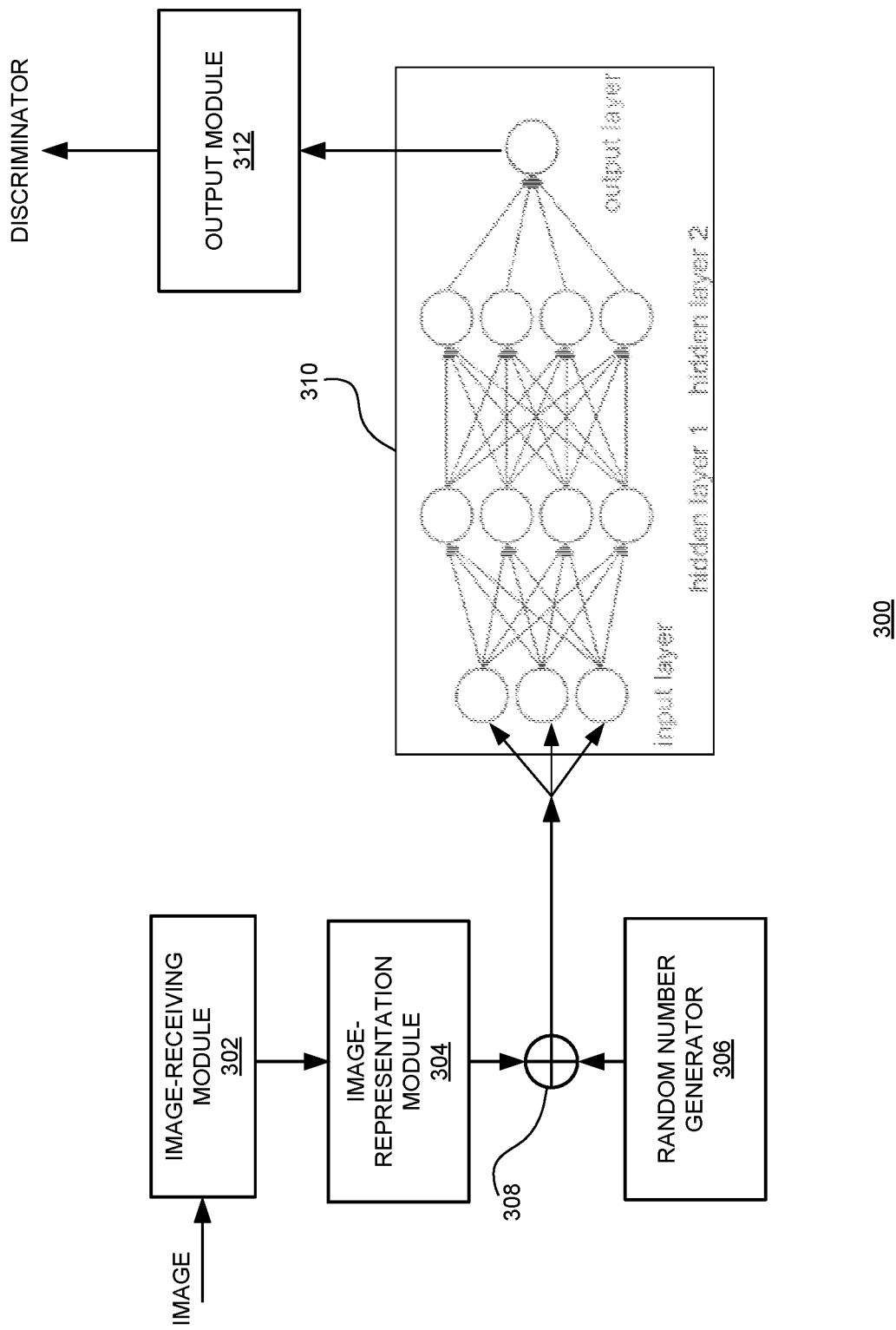
FIG. 3 shows the architecture of an exemplary generator, according to one embodiment of the present invention.

FIG. 3 shows the architecture of an exemplary generator, according to one embodiment. Generator 300 can include an image-receiving module 302 for receiving images, an image-representation module 304 for converting a received image to a multi-dimensional vector, a random number generator 306 for generating random noise, a combiner 308, and a neural network 310, which can include multiple layers (e.g., an input layer, an output layer, and multiple hidden layers). In some embodiments, neural network 310 can be a shape regressor. Generator 300 can also include an output module 312 for analyzing the output of neural network 310 and converting it to a desired format, such as 2D coordinates of outline points or shape distributions. For example, for each pixel of the image, generator 300 can generate an output indicating a likelihood that the pixel is on the outline of an object. In some embodiments, generator 300 can output a set of outline points (e.g., $((x_1, y_1), (x_2, y_2), \ldots, (x_n, y_n))$ or a probability distribution of the outline points. Note that the number of outline points generated by generator 300 can be arbitrary, depending on the shape of the outline. A more complicated outline may require more points to describe it, whereas a simpler outline may require fewer points. In general, the number of outline points produced or outputted by generator 300 does not need to match the number of ground truth outline points provided to the discriminator. This is advantageous compared to the Polygon-RNN approach where the number of outline points generated by the neural network needs to be the same as that of the training samples.

Note that the shape distribution of (x,y) coordinates is implicitly embedded inside neural network 310, because it receives as input the image. To generate the shape of an input image, one can make a forward pass of the neural network 310, which samples (x,y) coordinates from the implicit shape distribution. The shape coordinate system can be centered at the mid-point of the input image. For example, the origin of the x-y plane can be at the center of the input image.

Figure 4:
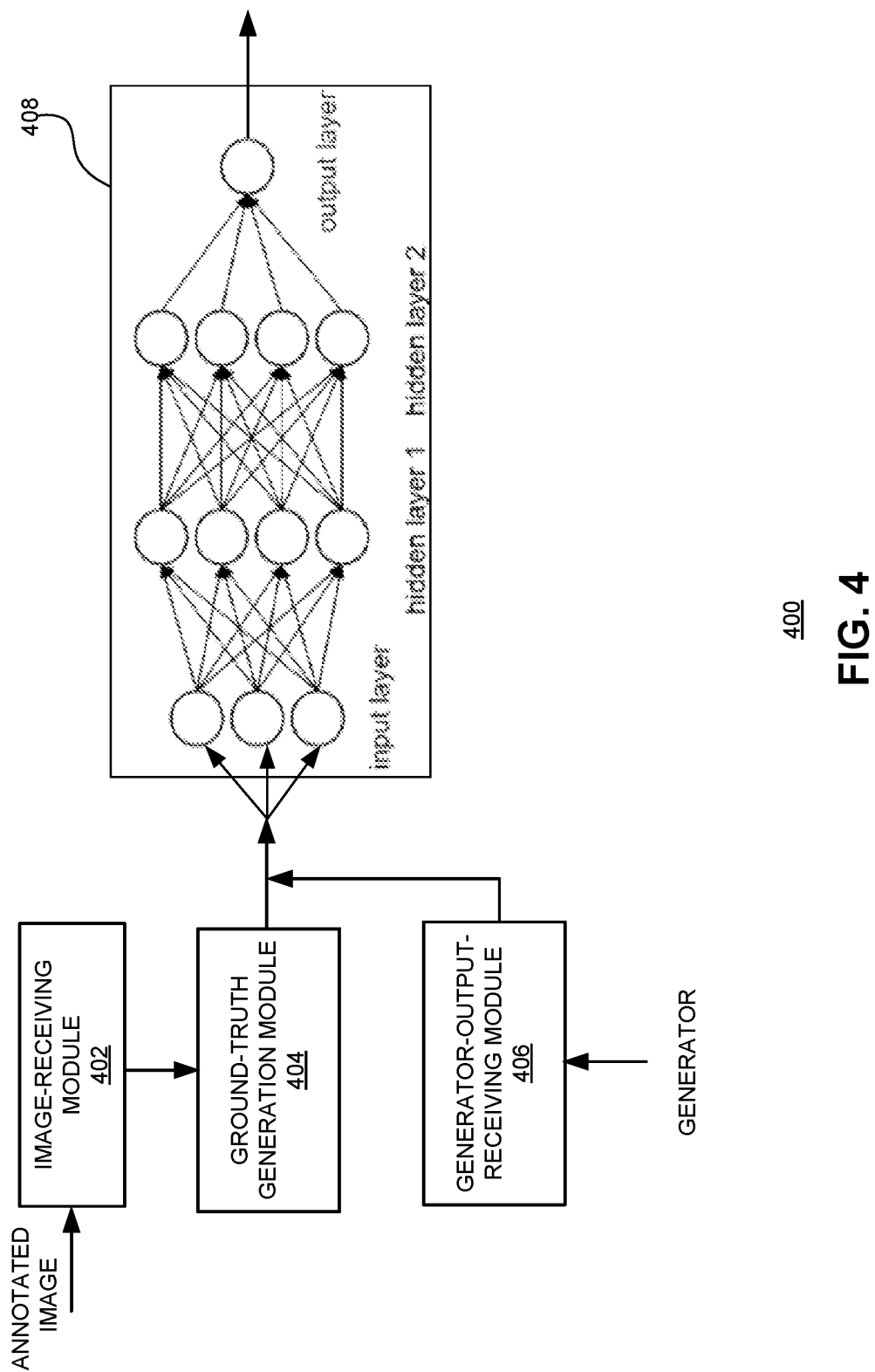
FIG. 4 shows the architecture of an exemplary critic, according to one embodiment of the present invention.

As with any type of GAN, the output of generator 300 can be sent to a discriminator module for comparison. In some embodiments, the discriminator computes the Wasserstein distance between the output of generator 300 and the ground truth. In the setting of Wasserstein-GAN, the discriminator can also be referred to as a critic, which outputs the scalar Wasserstein distance. FIG. 4 shows the architecture of an exemplary critic, according to one embodiment.

Discriminator 400 can include an image-receiving module 402 for receiving annotated sample images. More specifically, the sample images are annotated to show the contour or outlines of certain types of object (e.g., faces, cars, buildings, etc.). Discriminator 400 can also include a ground-truth-generation module 404 for generating the ground truth that can be used for comparison to the generator output. The ground truth can be extracted from the annotated sample images. In some embodiments, the ground truth can be the shape distribution (e.g., the probability distribution of the outline points (x*, y*). The number of outline points in the annotated image may not be the same as the number of outline points generated by generator 300. Discriminator 400 can also include a generator-output-receiving module 406 for receiving output of the generator. The output of the generator and the ground truth can be sent to a Wasserstein distance calculator 408, which calculates the Wasserstein distance. Note that a neural network is needed to learn a 1-Lipschitz function $f$, which is essential in calculating the Wasserstein distance W. In some embodiments, the Wasserstein distance can be calculated as:

$$W(P_s, P_*) = \max_{\|f\|_L \le 1} E_{(x,y) \sim P_s}[f(x,y)] - E_{(x,y) \sim P_*}[f(x,y)], \quad (1)$$

where $f$ is the 1-Lipschitz function, and $P_s$ and $P_*$ are the generator output and ground truth distributions, respectively. Note that clipping is needed to restrict the maximum weight value inf. More specifically, the weight factors of the discriminator need to be within a certain range controlled by a set of hyperparameters.

In some embodiments, the distributions of the x- and y-coordinates can be independently modeled and generated. In other words, the Wasserstein distance (or W-score) can be computed independently for the x-coordinates and y-coordinates. In alternative embodiments, the x- and y-coordinates can be jointly modeled via a complex shape representation. The output of Wasserstein distance calculator 408 is denoted the W-score.

Figure 5:
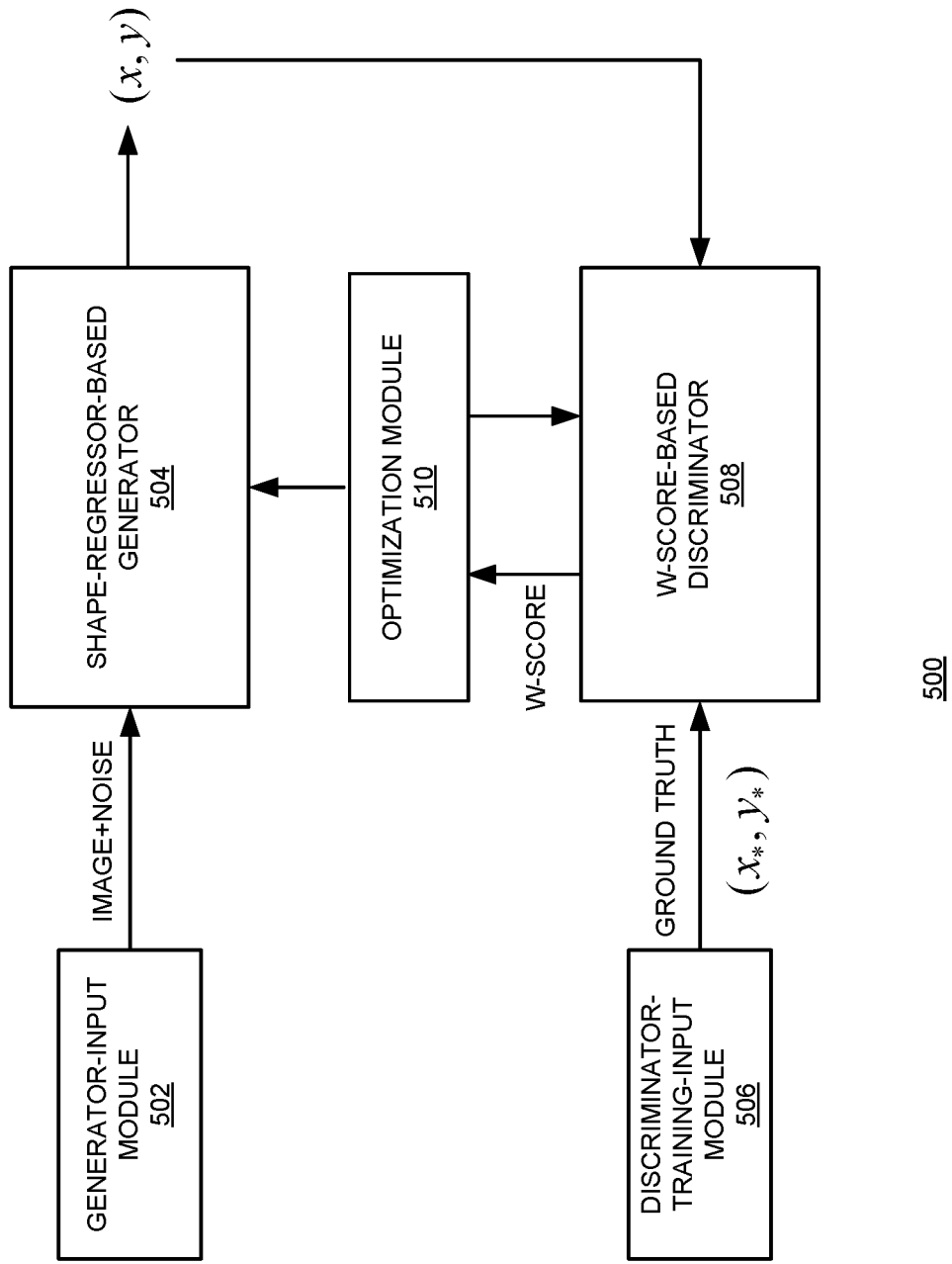
FIG. 5 shows the architecture of the exemplary contour-detection Wasserstein GAN (W-GAN), according to one embodiment of the present invention.

FIG. 5 shows the architecture of the exemplary contour-detection Wasserstein GAN (W-GAN), according to one embodiment of the present invention. Contour-detection W-GAN 500 can include a generator-input module 502, a shape-regressor-based generator 504, a discriminator-training-input module 506, a W-score-based discriminator 508, and an optimization module 510.

Generator-input module 502 can be responsible for providing input to shape-regressor-based generator 504. The input can include an image of interest and random noise. More specifically, generator-input module 502 can convert the image of interest into a multi-dimensional vector that can be sent to shape-regressor-based generator 504. The random noise can be updated between iterations. In some embodiments, shape-regressor-based generator 504 can include a neural network (e.g., a feedforward neural network) that functions as a shape regressor. More specifically, shape-regressor-based generator 504 can be configured to generate a candidate shape distribution (e.g., a set of outline points). Note that the image implicitly includes all information associated with the shape distribution. Accordingly, shape-regressor-based generator 504 can use a regression model to locate outline points (e.g., pixels) within the image. The number of outline points generated by shape-regressor-based generator 504 can be arbitrary and can be determined by the shape of the outline. Compared to the Polygon-RNN approach where the outline points are generated one by one, shape-regressor-based generator 504 can generate the entire outline using one pass. The output of shape-regressor-based generator 504 can include the coordinates of predicted outline points (e.g., $((x_1, y_1), (x_2, y_2), \ldots, (x_n, y_n))$ or their probability distribution P(x, y). The output of shape-regressor-based generator 504 can be sent to W-score-based discriminator 508.

Discriminator-training-input module 506 can send training samples (i.e., annotated sample images) to W-score-based discriminator 508. In some embodiments, discriminator-training-input module 506 can send coordinates of the ground truth outline points (e.g., $(x_{1*}, y_{1*}), (x_{2*}, y_{2*}), (x_{m*}, y_{m*})$) or their probability distribution $P(x_*, y_*)$ to W-score-based discriminator 508.

W-score-based discriminator 508 can compute the Wasserstein distance (or W-score) between the outline points produced by shape-regressor-based generator 504 and the ground truth outline points in the annotated sample images. More specifically, the W-score can be calculated using equation (1). In some embodiments, W-score-based discriminator 508 can include a neural network that is responsible for learning the 1-Lipschitz function based on the two probability distributions, which is essential in calculating the W-score. In some embodiments, W-score-based discriminator 508 can calculate the W-score independently for the x- and y-coordinates of the outline points, and then combine them to obtain a total score. This allows a simpler 1-Lipschitz function (the probability distribution has only one variable). In alternative embodiments, W-score-based discriminator 508 can calculate the W-score based on joint probability distributions of the x- and y-coordinates.

The W-score-based discriminator 508 can be trained when the parameters of shape-regressor-based generator 504 are fixed. After a predetermined number of iterations, W-score-based discriminator 508 can send the computed W-score to optimization module 510, which can determine whether an optimization condition has been met. The optimization condition can include the number of generator iterations being equal to or greater than a predetermined threshold value or the W-score being less than a predetermined value. If the optimization condition is met, optimization module 510 can configure shape-regressor-based generator 504 to output its current prediction as the predicted outline points. Otherwise, optimization module 510 can send a control signal to shape-regressor-based generator 504, such that shape-regressor-based generator 504 can adjust its parameters and produce new predictions of the outline points. This process can repeat itself until a predetermined optimization condition (e.g., based on the number of generator iterations or the W-score) is achieved. In general, a higher number of iterations often can result in a better prediction of the outline or contour. Note that, for each iteration of shape-regressor-based generator 504, W-score-based discriminator 508 often performs a large number (e.g., about 1000) of training iterations. In other words, for each update of parameters of shape-regressor-based generator 504, the parameters of W-score-based discriminator 508 have been updated a large number of times.

Figure 6:
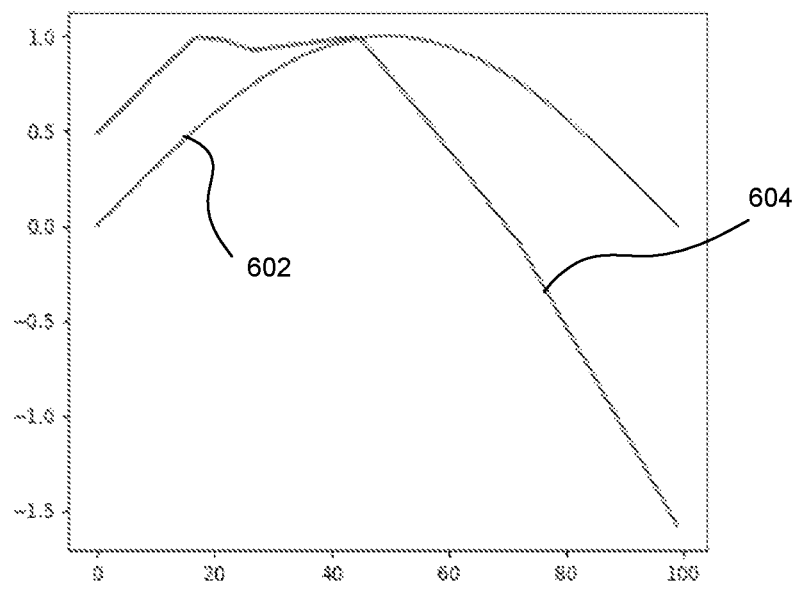
FIG. 6 shows the output of the contour-detection Wasserstein GAN (W-GAN) generator after a number of iterations, according to one embodiment of the present invention.
Figure 6:
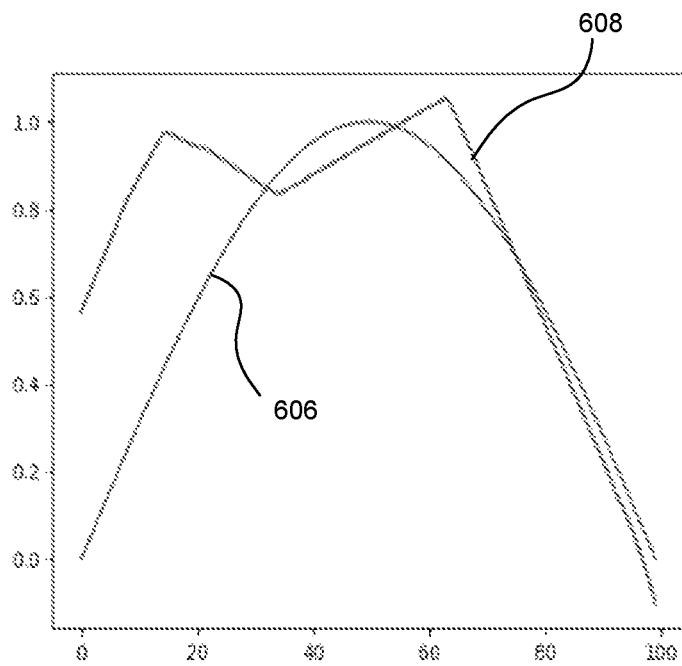

FIG. 6 shows the output of the contour-detection Wasserstein GAN (W-GAN) generator after a number of iterations, according to one embodiment of the present invention. The upper drawing shows the result after 149 iterations and the lower drawing shows the result after 949 iterations. In this example, the training samples can include 100 points randomly selected from a one-dimensional sine function within domain $[0, \pi]$, shown as curves 602 and 606. The predicted shapes (e.g., the output of the shape-regressor-based generator) are shown as curves 604 and 608. The shape-regressor-based generator can include, for example, a 2-layer perceptron with 50 neurons each, and the W-score-based discriminator can have a similar network structure as the shape-regressor-based generator. The input random noise can be a 100-dimensional noise. In each iteration, the W-score-based discriminator is trained for 1000 steps and the shape-regressor-based generator is trained for one step (i.e., make a one-step forward pass). As one can see from FIG. 6, as the number of iterations increases, the predicted shape approaches the true target shape.

Figure 7A:
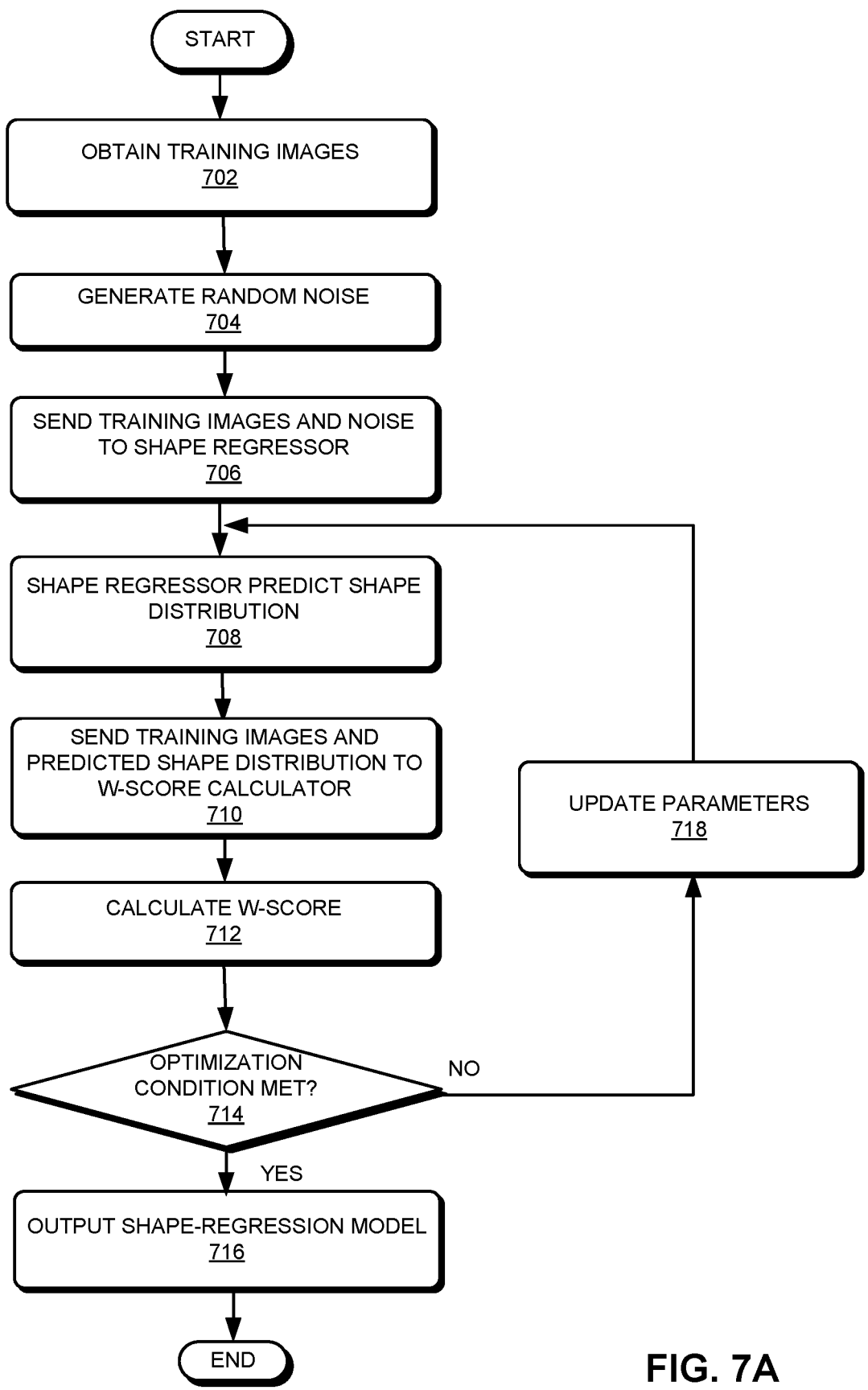
FIG. 7A presents a flowchart illustrating an exemplary training process of a contour-detection Wasserstein GAN (W-GAN), according to one embodiment of the present invention.

FIG. 7A presents a flowchart illustrating an exemplary training process of a contour-detection Wasserstein GAN (W-GAN), according to one embodiment of the present invention. During operation, the system obtains a number of training images (operation 702). Note that the training images have been annotated. More specifically, object contours or outlines have been labeled in those training images, representing the ground truth of the shape distribution. The system generates random noise (operation 704). The training images and the random noise can be combined and sent to a shape regressor (operation 706). In some embodiments, the shape regressor can include a feedforward neural network that can be trained to detect contours or outlines of objects in images. The shape regressor predicts image shape distribution (e.g., positions of points on the outline or contour of at least one object) of the training images (operation 708). In some embodiments, the predicted image shape distribution can include a number of outline points and their probability distributions. The number of outline points can be different from the number of outline points labeled in the annotated sample images. The annotated sample images (i.e., the ground truth) and the predicted shape distribution can be sent to a W-score calculator (operation 710).

The W-score calculator computes the Wasserstein distance (W-score) between the predicted shape distribution and the ground truth (operation 712). More specifically, a neural network in the W-score calculator may be trained over a large number of iterations before outputting a calculated W-score. The system then determines whether a predetermined optimization condition is met (operation 714). The predetermined optimization condition can include whether the number of parameter-update iterations of the shape regressor has reached a predetermined threshold value or whether the W-score is below a threshold value. If the optimization condition is met, the system outputs the shape-regression model (operation 716). Otherwise, the system updates the parameters of the shape-regressor (operation 718) and the new prediction is made (operation 708). More specifically, the parameters of the shape-regressor are updated in such a way that the subsequently generated Wasserstein distance can be reduced, meaning the similarity between the predicted shape distribution and the ground truth shape distribution has been increased.

Figure 7B:
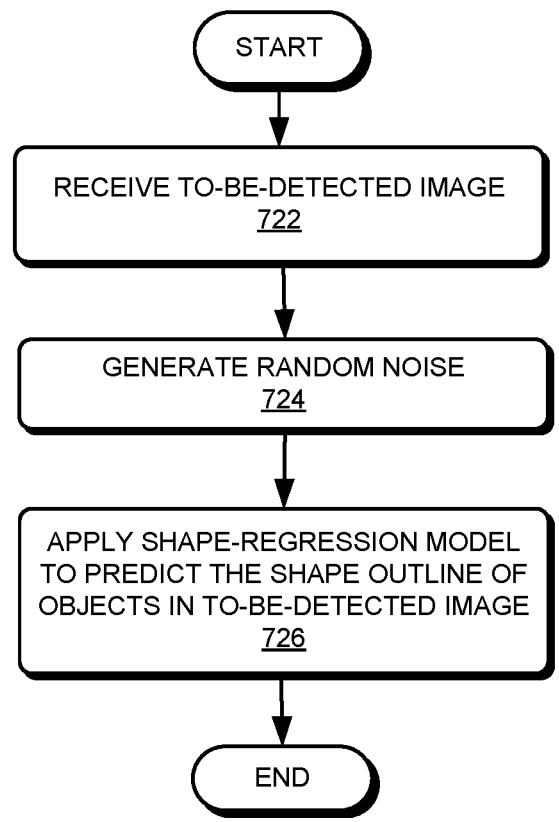
FIG. 7B presents a flowchart illustrating an exemplary shape-detection process, according to one embodiment of the present invention.

FIG. 7B presents a flowchart illustrating an exemplary shape-detection process, according to one embodiment of the present invention. During operation, the system can receive a to-be detected image that includes at least one object (operation 722). A random noise-generator within the system can generate a random noise (operation 724). In some embodiments, the random noise can have a normal or uniform distribution. The system can then apply the previously trained shape-regression model to predict the shape outline of one or more objects within the to-be-detected image (operation 726). In some embodiments, the image and noise can be sent to the shape-regressor, which applies the trained shape-regression model.

In general, embodiments of the present invention provide a solution for fast inference of object boundaries or outlines in images. Compared to conventional approaches that only detect rectangular regions around objects, the boundary detection can provide a much greater precision. On the other hand, compared to the approaches that are based on pixel level instance segmentation, the current W-GAN approach can be much faster, thus enabling real-time application. For example, when a camera system scans the road, cars in the images can be detected with their outlines marking their locations in real-time using the contour-detection W-GAN. Similarly, in various face-detection applications (e.g., user authentication or surveillance), instead of marking faces using rectangular boxes, the actual outline of each face can be detected and marked using the contour-detection W-GAN. Moreover, the shape-detection ability can also enhance the performance of various object-detection applications.

Exemplary Computer System and Apparatus

Figure 8:
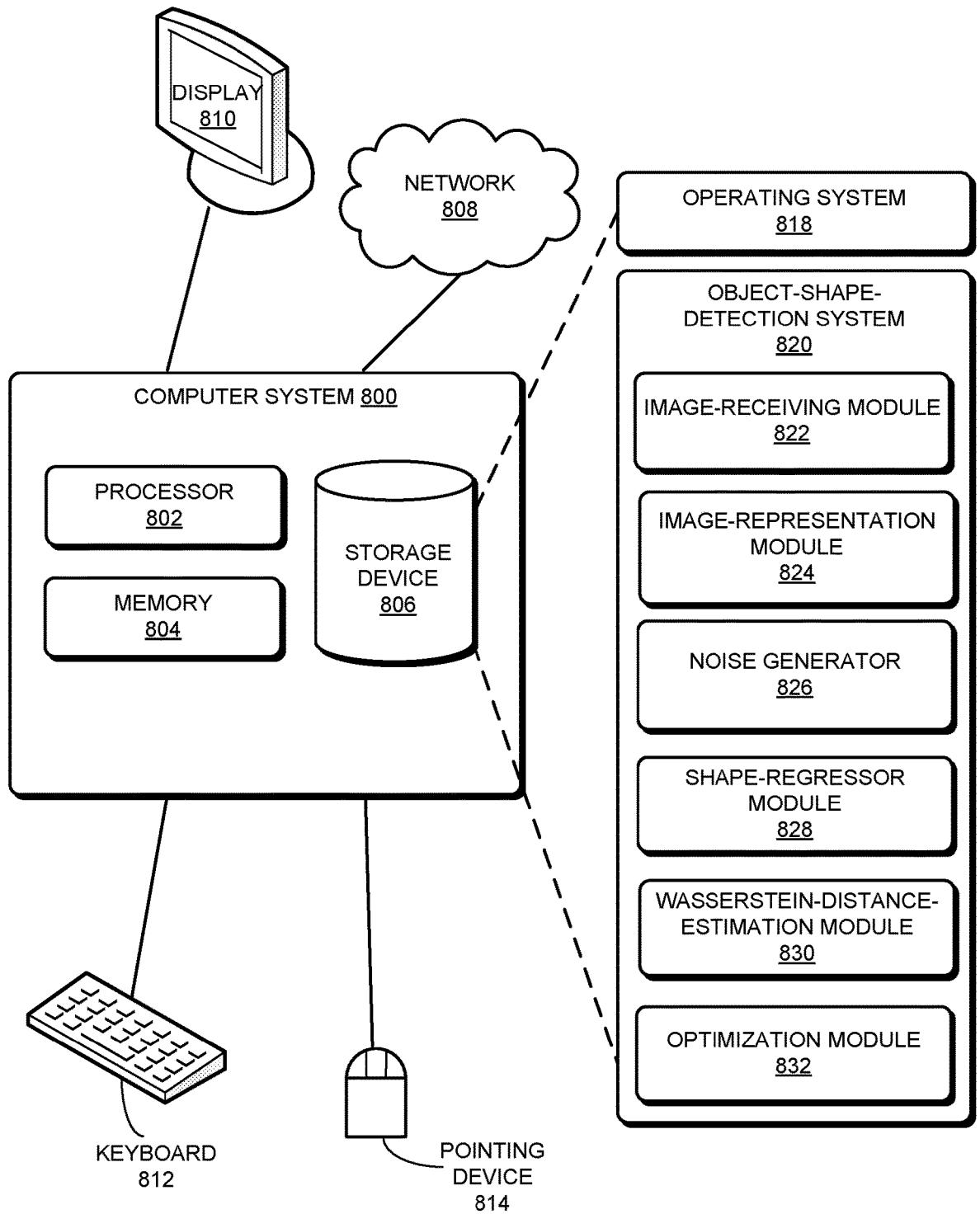
FIG. 8 illustrates an exemplary computer system that facilitates an object-shape-detection system, according to one embodiment of the present invention.

FIG. 8 illustrates an exemplary computer system that facilitates an object-shape-detection system, according to one embodiment of the present invention. Computer system 800 includes a processor 802, a memory 804, and a storage device 806. Computer system 800 can be coupled to a display device 810, a keyboard 812, and a pointing device 814, and can also be coupled via one or more network interfaces to network 808. Storage device 806 can store an operating system 818, and an object-shape-detection system 820.

Object-shape-detection system 820 can include instructions, which when executed by computer system 800 can cause computer system 800 to perform methods and/or processes described in this disclosure. Object-shape-detection system 820 can include instructions for receiving images, including both the image of interest and annotated training samples (image-receiving module 822), instructions for extracting image representations from the images (image-representation module 824), and instructions for generating noise (noise generator 826). Furthermore, object-shape-detection system 820 can include instructions for applying a shape-regression model (shape-regressor module 828), instructions for estimating the Wasserstein distance between the predicted shape distribution and the ground truth (Wasserstein-distance-estimation module 830), and instructions for optimizing parameters of the shape-regressor module based on the estimated Wasserstein distance (optimization module 832).

Figure 9:
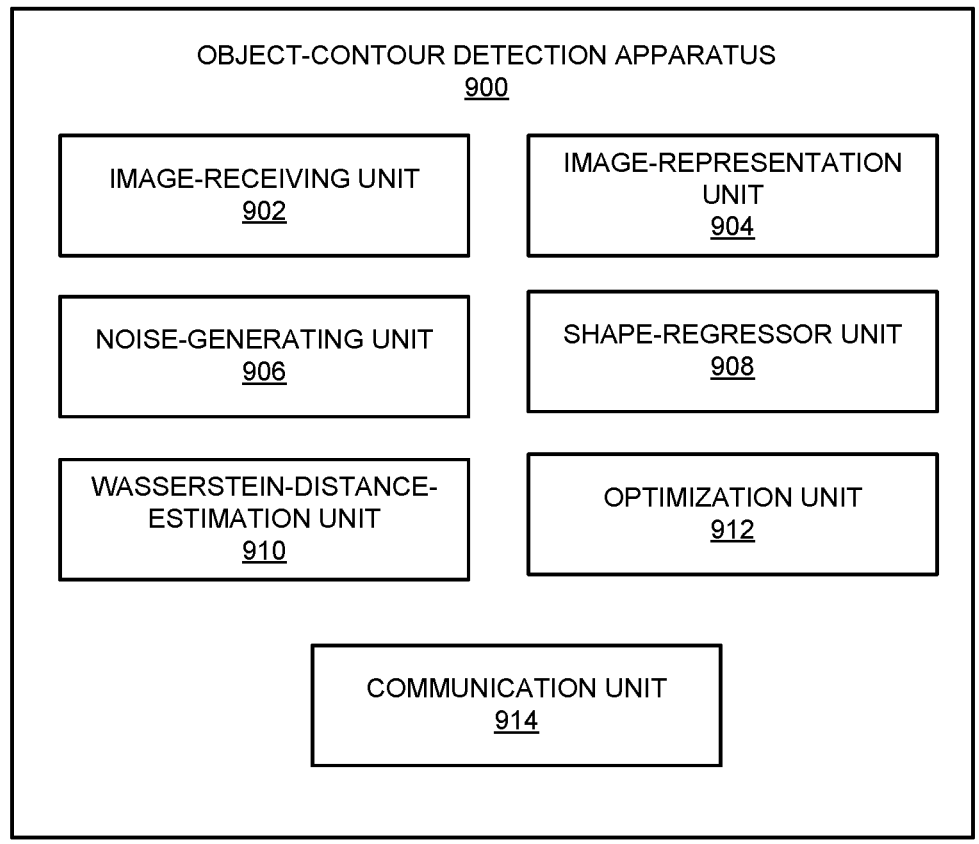
FIG. 9 illustrates an exemplary apparatus that facilitates an object-contour-detection system, according to one embodiment of the present invention.

FIG. 9 illustrates an exemplary apparatus that facilitates an object-contour-detection system, according to one embodiment of the present invention. Apparatus 900 can comprise a plurality of units or apparatuses that may communicate with one another via a wired, wireless, quantum light, or electrical communication channel. Apparatus 900 may be realized using one or more integrated circuits, and may include fewer or more units or apparatuses than those shown in FIG. 9. Further, apparatus 900 may be integrated in a computer system, or realized as a separate device that is capable of communicating with other computer systems and/or devices. Specifically, apparatus 900 can comprise units 902-912, which perform functions or operations similar to modules 822-832 of computer system 800 of FIG. 8, including: an image-receiving unit 902, an image-representation unit 904, a noise-generating unit 906, a shape-regressor unit 908, a Wasserstein-distance-estimation unit 910, and an optimization unit 912. Apparatus 900 can further include a communication unit 914.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting outlines of objects in images, the method comprising:
   receiving a two-dimensional (2D) image comprising 2D information associated with at least one object;
   generating a random noise signal;
   providing the received 2D image and the random noise signal to a shape-regressor module, which applies a shape-regression model to predict a shape outline of an object within the received image based on the 2D information associated with the object, wherein the shape-regression model comprises a Wasserstein generative adversarial network (W-GAN) that is trained using 2D information provided by a set of annotated training images, and wherein a respective training image is annotated by defining a 2D true shape outline of at least one object within the training image.

2. The method of claim 1, further comprising training the shape-regression model, which comprises:
   inputting the annotated training images and a random noise signal to the shape-regression model to obtain estimated shape outlines;
   providing the estimated shape outlines and true shape outlines to a discriminator module that computes a Wasserstein distance between probability distributions of the estimated shape outlines and true shape outlines; and
   optimizing parameters of the shape-regression model based on the Wasserstein distance computed by the discriminator module.

3. The method of claim 2, wherein optimizing the shape-regression model comprises updating parameters of the shape-regression model in such a way that the computed Wasserstein distance is reduced.

4. The method of claim 2, wherein the shape-regressor module is implemented as a first neural network, and wherein the discriminator module is implemented as a second neural network.

5. The method of claim 4, wherein the first and second neural networks together form a generative adversarial network (GAN).

6. The method of claim 1, wherein the predicted shape outline is defined in terms of Cartesian x-y coordinates along a boundary of the object.

7. The method of claim 1, wherein the predicted shape outline is defined in terms of probabilities of image pixels belonging to a boundary of the object.

8. An apparatus for detecting outlines of objects in images, comprising:
   a processor;
   a memory coupled to the processors storing instructions that when executed by the processors cause the processors to perform a method, the method comprising:
   receiving a two-dimensional image comprising 2D information associated with at least one object;
   generating a random noise signal;
   providing the received 2D image and the random noise signal to a shape-regressor module configured to apply a shape-regression model to predict a shape outline of an object within the received image based on the 2D information associated with the object, wherein the shape-regression model comprises a Wasserstein generative adversarial network (W-GAN) that is trained using 2D information provided by a set of annotated training images, and wherein a respective training image is annotated by defining a 2D true shape outline of at least one object within the training image.

9. The apparatus of claim 8, further comprising a discriminator module that facilitates training of the shape-regression model;
wherein training the shape-regression model comprises:
inputting the annotated training images and a random noise signal to the shape-regression model to obtain estimated shape outlines;
providing the estimated shape outlines and true shape outlines to the discriminator module that computes a Wasserstein distance between probability distributions of the estimated shape outlines and true shape outlines; and
optimizing parameters of the shape-regression model based on the Wasserstein distance computed by the discriminator module.

10. The apparatus of claim 9, wherein optimizing the shape-regression model comprises updating parameters of the shape-regression model in such a way that the computed Wasserstein distance is reduced.

11. The apparatus of claim 9, wherein the shape-regressor module is implemented as a first neural network, and wherein the discriminator module is implemented as a second a second neural network.

12. The apparatus of claim 11, wherein the first and second neural networks together form a generative adversarial network (GAN).

13. The apparatus of claim 8, wherein the predicted shape outline is defined in terms of Cartesian x-y coordinates along a boundary of the object.

14. The apparatus of claim 8, wherein the predicted shape outline is defined in terms of probabilities of image pixels belonging to a boundary of the object.

15. A non-transitory computer-readable storage medium storing instructions that when executed by a computer cause the computer to perform a method for detecting outlines of objects in images, the method comprising:
receiving a two-dimensional (2D) image comprising 2D information associated with at least one object;
generating a random noise signal;
providing the received 2D image and the random noise signal to a shape-regressor module, which applies a shape-regression model to predict a shape outline of an object within the received image based on the 2D information associated with the object, wherein the shape-regression model comprises a Wasserstein generative adversarial network (W-GAN) that is trained using 2D information provided by a set of annotated training images, and wherein a respective training image is annotated by defining a 2D true shape outline of at least one object within the training image.

16. The non-transitory computer-readable storage medium of claim 15, wherein the method further comprises training the shape-regression model, and wherein training the shape-regression model comprises:
inputting the annotated training images and a random noise signal to the shape-regression model to obtain estimated shape outlines;
providing the estimated shape outlines and true shape outlines to a discriminator module that computes a Wasserstein distance between probability distributions of the estimated shape outlines and true shape outlines; and
optimizing parameters of the shape-regression model based on the Wasserstein distance computed by the discriminator module.

17. The non-transitory computer-readable storage medium of claim 16, wherein optimizing the shape-regression model comprises updating parameters of the shape-regression model in such a way that the computed Wasserstein distance is reduced.

18. The non-transitory computer-readable storage medium of claim 16, wherein the shape-regressor module is implemented as a first neural network, wherein the discriminator module is implemented as a second, and wherein the first and second neural networks together form a generative adversarial network (GAN).

19. The non-transitory computer-readable storage medium of claim 15, wherein the predicted shape outline is defined in terms of Cartesian x-y coordinates along a boundary of the object.

20. The non-transitory computer-readable storage medium of claim 15, wherein the predicted shape outline is defined in terms of probabilities of image pixels belonging to a boundary of the object.

* * * * *